April 29, 1952  C. M. GORDON  2,595,134
UNIVERSAL MANIPULATOR FOR GRASPING TOOLS
Filed Jan. 2, 1951
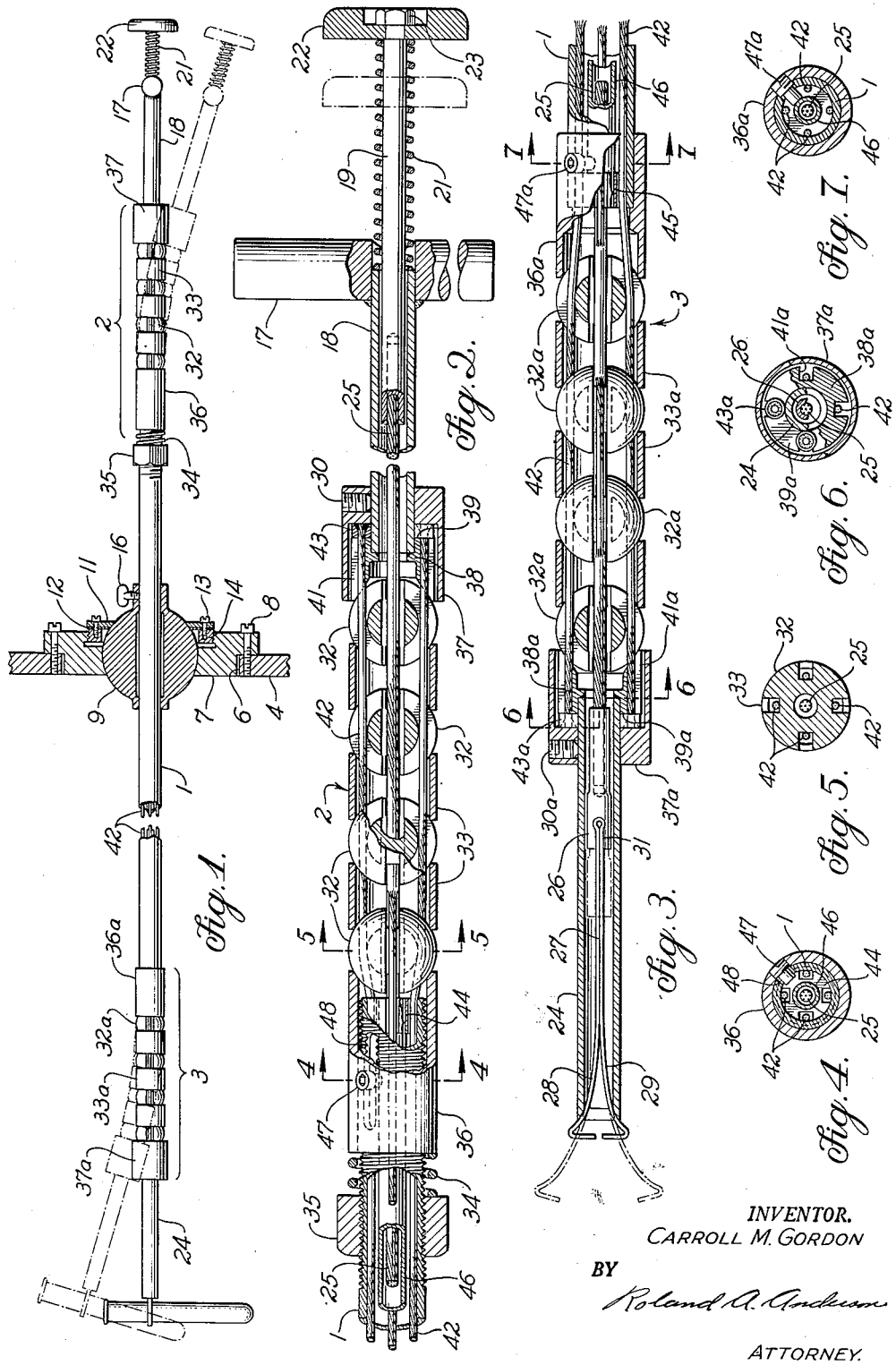
INVENTOR.
CARROLL M. GORDON
BY
Roland A. Anderson
ATTORNEY.

Patented Apr. 29, 1952

2,595,134

UNITED STATES PATENT OFFICE 2,595,134

UNIVERSAL MANIPULATOR FOR GRASPING TOOLS

Carroll M. Gordon, San Pablo, Calif., assignor to the United States of America as represented by the United States Atomic Energy Commission Application January 2, 1951, Serial No. 203,962

11 Claims. (Cl. 294—99)

This invention relates to a grappling and manipulating device, and more particularly to an adjustable, remotely controlled, flexible grasping tool capable of a variety of motions under the control of an operator.

In recent years a need has developed for a remote control manipulator that will enable a person, while located behind a protective wall, to perform certain operations normally performed by hand. Such a manipulator is especially required where the handling of radioactive materials is involved, or materials which are toxic biologically, either to the skin or lungs. Heretofore, remote control manipulators have been cumbersome and severely limited in the type of movements of which they are capable, also, such devices were awkward to use and required considerable practice.

It is, therefore, an object of this invention to provide a manipulator which may be mounted in a protective wall to effect slidable and turnable motion of the grasping end thereof as well as angular displacement as an element of a conical surface of revolution.

It is another object of this invention to provide an elongated manipulator with grasping jaws at one end subject to operator control from the opposite end.

It is a further object of this invention to provide a manipulator capable of a turbinate motion at the controlled end in dependence on a similar turbinate motion at the controlling end.

Other objects and advantages reside in the construction of parts, the combination thereof, and the mode of operation, as will become more apparent from the following description.

In the accompanying drawings, like characters indicate like parts throughout the several views.

Referring to the drawings:

Figure 1 is an end elevation view of the manipulator and wall mounting therefor, the latter being in section;

Fig. 2 is a view in longitudinal cross section and partially in elevation of the controlling end of the manipulator;

Fig. 3 is a similar view of the controlled end of the manipulator;

Fig. 4 is a cross-sectional view taken on line 4—4 of Fig. 2;

Fig. 5 is a cross-sectional view taken on line 5—5 of Fig. 2;

Fig. 6 is a cross-sectional view taken on line 6—6 of Fig. 3; and

Fig. 7 is a cross-sectional view taken on line 7—7 of Fig. 3.

In general, the manipulator of this invention includes (1) a tubular member which may have ball and socket mounting in a supporting wall; (2) articulated actuating means disposed at one end of said member; (3) articulated actuated means disposed at the other end of said member and (4) flexible means extending longitudinally within said member and interconnecting said articulated means for producing movement of the actuated means in response to movement of said actuating means, and preferably, means also for suitably gripping an article to be manipulated. Since the central or body portion of the manipulator is structurally somewhat symmetrical about the mounting as a reference point the following description will proceed from such reference.

Attention is now directed to Fig. 1 of the drawing which shows one advantageous form of ball and socket mounting for the tubular barrel 1 in the wall 4 although it will be apparent that various structural designs providing the equivalent of ball and socket action will be equally efficient. Wall 4 is provided with a circular aperture 6 adapted to receive a thickened cover plate 7 in marginal overlapping relationship and united at such peripheral overlapping portions by screws 8. It will be understood that for the primary use of the manipulator of this invention in handling containers from behind a protecting shield of suitable composition, the wall 4 and also the cover plate 7 are preferably made of suitable radiation opaque material. Cover plate 7 is provided with an enlarged central aperture having a curved edge portion for close engagement with a ball element 9 which serves as a central support and guide for tubular barrel 1. Ball element 9 may be adjustably and removably retained in position by means of a circular plate 11 having a bevelled, inner edge adapted to bear on the curved surface of the ball element through a ring-shaped, interposed gasket 12 and maintained in position by screws 13 threaded into an inner ring 14 which in turn is threaded into a stepped recess in the cover plate 7, as shown.

Through the conveniently rotatable adjustment of ring 14 the frictional engagement between gasket 12 and the surface of ball element 9 may be varied to provide the optimum force of friction between these parts for maintenance of the barrel 1 in an angularly adjusted position, but readily movable to a new position as required. Longitudinal adjustment of barrel 1 with respect to ball element 9 is readily accomplished with the structure disclosed and maintenance of such adjustment insured by the thumb screw 16 carried by an extension of ball element 9 and serving to clamp such element and barrel 1 together, as desired.

Consider now the articulated actuating means 2 connected to the right end of barrel 1 and sectionally illustrated in Fig. 2. Beginning at the right end of this figure it will be seen that such assembly includes a hand grip 17 having a transverse bore in which one end of a tubular member 18 extends and is fixed, as by welding. Within tubular member 18 is disposed a plunger 19 normally spring pressed away from hand grip 17 by means of encircling coil spring 21, the left end of which is seated in the bore of hand grip 17 and rests against the end of tubular member 18, while the right end thereof presses against a manually operable plunger button 22 mounted on the end of plunger 19 by means of a retainer such as lock nut 23. It will be apparent that the plunger 19 is adapted for piston-like movement within tubular member 18 against the action of spring 21; such movement is communicated to a cable 25 suitably united thereto and extending axially through articulated means 2, tubular member 1, articulated means 3 and into a tubular guide 24 secured to the latter. A cylindrical slider 26 within guide 24 receives the end of cable 25 and carries a work gripping element 27 formed of a resilient steel strip having elongated portions 28, 29 disposed in parallelism within guide 24 and inwardly within cylindrical slide 26 and snugly received in a keyhole type slot 31.

Articulated means 2 comprises a series of balls 32, preferably four in number, separated by cylindrical spacers 33 of slightly less internal diameter and subjected to the compressive force of coil spring 34 surrounding the threaded right end of barrel 1 on which is mounted adjustable nut 35 for varying the spring action exerted against a cylindrical sleeve 36 which surrounds the right end of tubular barrel 1 (Fig. 1) and whose right end rests against the surface of the proximate ball 32 while its left end receives the thrust of coil spring 34. Adjacent the left end of tubular member 18 is rigidly united as by set screw 30 a cylindrical retainer 37 which is of slightly larger diameter than spacers 33 in order that frictional engagement of the proximate ball 32 and the inner edge of such retainer will be avoided, the force of spring 34 communicated to such ball being received instead by a thrust washer 38 having an inwardly dish shaped contour to marginally contact said ball and secured to the end of member 18 as by brazing, for example. The periphery of thrust washer 38 is provided with four slots 41 spaced 90° apart for receiving and retaining therein four cables 42 whose ends are surrounded by integral retaining buttons 43 having enlarged diameters overlapping the walls of notches 41 and abutting end wall 39 of thrust washer 38. The buttons 43 are retained in a space surrounding the tubular member 18 between washer 38 and cylindrical retainer 37.

Referring now to Fig. 3, it will be noted that an articulated structure duplicating, in general, that just described is provided at the grasping end of my improved manipulator. Interconnecting the two articulated structures 2 and 3, cables 42 are retained in slots 41a of thrust washer 38a and terminate in buttons 43a which abut end wall 39a of said thrust washer. Set screw 30a, sleeve 36a, cylindrical retainer 37a, as well as balls 32a and spacers 33a of Fig. 3 have the same function as the corresponding parts already described and shown in Fig. 2.

It will be noted from Fig. 5 that the surface of each of balls 32, 32a is circumferentially grooved in right angularly intersecting planes passing through the center of each ball for guiding cables 42 and also centrally bored along the axis of intersection to guide cable 25 therethrough. Additional peripherally notched cable guide disks 44, 45 within tubular member 1 surround and are fixed to an inner guide tube 46 at each end thereof and also to the inner wall of the threaded and opposite end portions, respectively, of tubular member 1. Set screw 47 threaded into an aperture in sleeve 36 extends also through a longitudinal slot 48 in the threaded portion of tubular member 1 to prevent relative rotation of guide 44, tube 46, tubular member 1 or sleeve 36 while set screw 47a, as shown in Figs. 3 and 7, is similarly threaded into sleeve 36a and extends through an aperture in tubular member 1 into engagement with inner tube 46 to prevent relative rotation of these parts. It will be appreciated that the structure just described has the function of preventing twisting of the cables 42, in use.

From Figs. 2 and 3, the opening and closing movement of the work gripping element 27, in response to movement of plunger button 22, is readily apparent. Also in Fig. 1 is seen that with spring 34 suitably compressed by adjustment of nut 35, movement of hand grip angularly about articulated structure 2 and more specifically, sleeve 36 as a center produces a corresponding but opposite movement of the work gripping element about articulated structure 3. By reversing the relative positions of cables 42 in the balls 32 and 32a, respectively, the foregoing actuating movement will produce a duplicative actuated movement rather than an opposite movement if such action is desired. Other variations will occur to one skilled in the art. Accordingly, it is desired that the invention be limited only as defined in the following claims.

What is claimed is:

1. A remotely actuable manipulator comprising a tubular member, means at one end of said member and extending through the latter for transmitting opening and closing movement to a pair of separable jaws disposed at the other end thereof, means at said one end of said member for actuating said first means, means connected to the actuated end of said member for bodily moving said jaws angularly with respect to the axis of said member and control means at said one end of said member for effecting said last named movement of said jaws upon opposite movement of said control means.

2. A remotely actuable manipulator comprising a tubular member, inextensible flexible means disposed in said member, angularly movable, articulated, actuating means connected to one end of said flexible means and adjacent one end of said member, angularly movable, articulated actuated means connected to the other end of said flexible means and adjacent the other end of said member and spring means for moving each of said articulated means outwardly and oppositely from said member to tension said flexible means.

3. A remotely actuable manipulator comprising a pair of outwardly spring-pressed jaws, a tubular guide for receiving said jaws, a slidable member connected to said jaws and longitudinally movable within said guide, a central tubular member adapted for external support intermediate its ends, articulated means connecting said guide to one end of said central tubular member and a similar articulated means connected to the other end of said tubular member, cable means extending from said guide through both said articulated means and said central tubular member to a manually operable control element and additional cable means disposed in said tubular member and connecting said slidable member to a plunger element adjacent said control element.

4. A remotely actuable manipulator comprising a tubular member, a plurality of cables disposed in said member, angularly movable, articulated, actuating means connected to one end of said cables and adjacent one end of said member, angularly movable, articulated actuated means connected to the other end of said cables and adjacent the other end of said member and adjustable spring means for urging each of said articulated means outwardly and oppositely from said member to tension said cables.

5. A remotely actuable manipulator comprising a tubular member having ball and socket mounting adapted for disposition in a supporting wall, inextensible flexible means disposed in said member, angularly movable, articulated, actuating means connected to one end of said flexible means and adjacent one end of said member, angularly movable, articulated actuated means connected to the other end of said flexible means and adjacent the other end of said member and spring means for urging each of said articulated means outwardly and oppositely from said member to tension said flexible means.

6. A remotely actuable manipulator comprising a tubular member, inextensible flexible means disposed in said member, angularly movable, articulated, actuating means connected to one end of said flexible means and adjacent one end of said member, angularly movable, articulated actuated means connected to the other end of said flexible means and adjacent the other end of said member, each of said articulating means including alternating slotted balls and spacers for guiding said flexible means therethrough, and spring means for urging each of said articulated means outwardly and oppositely from said member to tension said flexible means.

7. A remotely actuable manipulator comprising a tubular member, a plurality of spaced cables disposed in said member, angularly movable, articulated, actuating means connected to one end of said cables and adjacent one end of said member, angularly movable, articulated actuated means connected to the other end of said cables and adjacent the other end of said member, each of said articulating means including alternating slotted balls and spacers for guiding said cables therethrough, and spring means for moving each of said articulated means outwardly and oppositely from said member to tension said cables.

8. A remotely actuable manipulator comprising a tubular member inextensible flexible means disposed in said member, angularly movable, articulated, actuating means including a tubular guide connected to one end of said flexible means and adjacent one end of said member, angularly movable, articulated actuated means including a guide tube connected to the other end of said flexible means and adjacent the other end of said member, each of said articulating means including alternating slotted balls and spacers for guiding said flexible means therethrough, spring means for moving each of said articulated means outwardly and oppositely from said member to tension said flexible means, a pair of spring pressed jaws disposable within said tubular guide, a flexible cable connected to said jaws and extending through said tubular member and both said articulated means, and manually operable means connected to said cable for moving said jaws into and out of said tubular guide into work gripping or work releasing relation.

9. The combination as recited in claim 8, including a diametrically apertured ball through which said tubular member extends in supported relation and a socket snugly surrounding the diameter of said ball in adjustable frictional relation therewith.

10. The combination as recited in claim 6 wherein said articulated means includes a plurality of guides having spaced slots corresponding to the slots in said balls and fixed to said tubular member.

11. The combination as recited in claim 6 wherein said articulated means includes plurality of guides having spaced slots corresponding to the slots in said balls and fixed to said tubular member, and an inner tubular member disposed within said fixed tubular member and having its end portions fixed respectively to said guides for insuring continuous parallelism of said cables.

CARROLL M. GORDON.

REFERENCES CITED

The following references are of record in the file of this patent:

UNITED STATES PATENTS

| Number | Name | Date |
|---|---|---|
| 521,208 | Day et al. | June 12, 1894 |
| 767,835 | Raoul | Aug. 16, 1904 |
| 975,727 | Smith | Nov. 15, 1910 |
| 2,374,582 | Caldarelli | Apr. 24, 1945 |